United States Patent

[11] 3,565,373

| [72] | Inventor | William A. Frye |
| | | Dayton, Ohio |
| [21] | Appl. No. | 872,195 |
| [22] | Filed | Oct. 29, 1969 |
| [45] | Patented | Feb. 23, 1971 |
| [73] | Assignee | General Motors Corporation |
| | | Detroit, Mich. |

[54] ENGINE MOUNT ASSEMBLY
7 Claims, 7 Drawing Figs.

[52] U.S. Cl..................................................... 248/9;
180/64; 248/15
[51] Int. Cl.................................................. F16f 15/00
[50] Field of Search......................................... 248/358, 3,
5, 6, 8, 9, 10, 15, 24, 22; 267/1 (R); 180/64

[56] References Cited
UNITED STATES PATENTS
1,779,235  10/1930  Haushalter .................. 248/10

| 2,953,336 | 9/1960 | Etchells......................... | 248/9 |
| 3,326,501 | 6/1967 | Cauvin.......................... | 248/358 |
| 3,430,901 | 3/1969 | Cauvin.......................... | 248/15X |

Primary Examiner—Roy D. Frazier
Assistant Examiner—J. Franklin Foss
Attorneys—Jean L. Carpenter and Arthur N. Krein ABSTRACT: An engine mount assembly for supporting a vehicle engine on the cross member of a vehicle frame comprising two interlocking support members, one of which includes a rubber support sandwiched between a primary engine mounting bracket and a support bracket, and the other member includes a secondary engine mounting bracket having rubber roll stops and fore and aft compression pads bonded thereto, the latter being compressed between the two support members in the assembled position, this structure permitting the use of a different rubber compound for the fore and aft pads and roll stops than that used for the support sandwiched portion of the other support member.

PATENTED FEB 23 1971

INVENTOR.
William A. Frye
BY
Arthur N. Krein
ATTORNEY

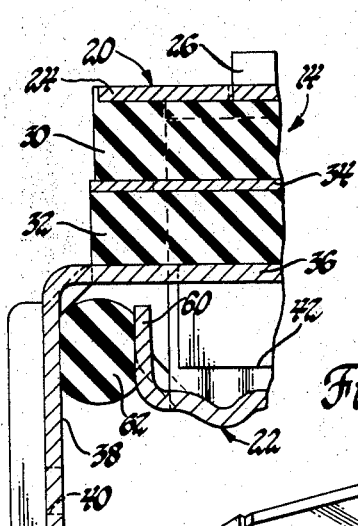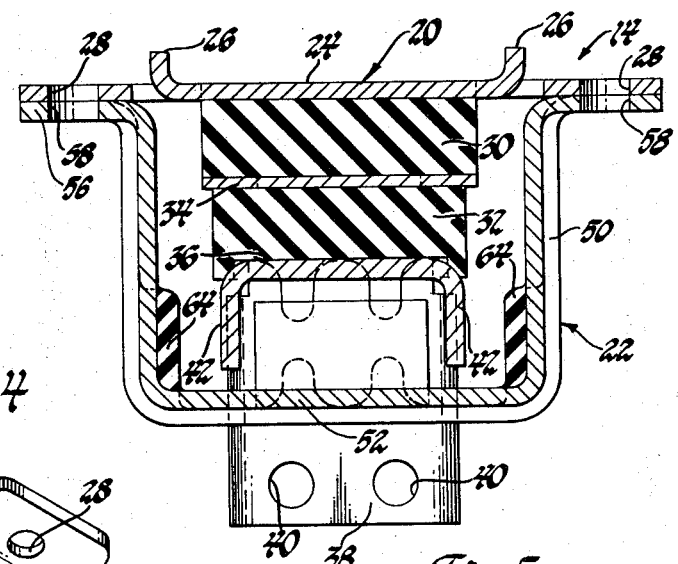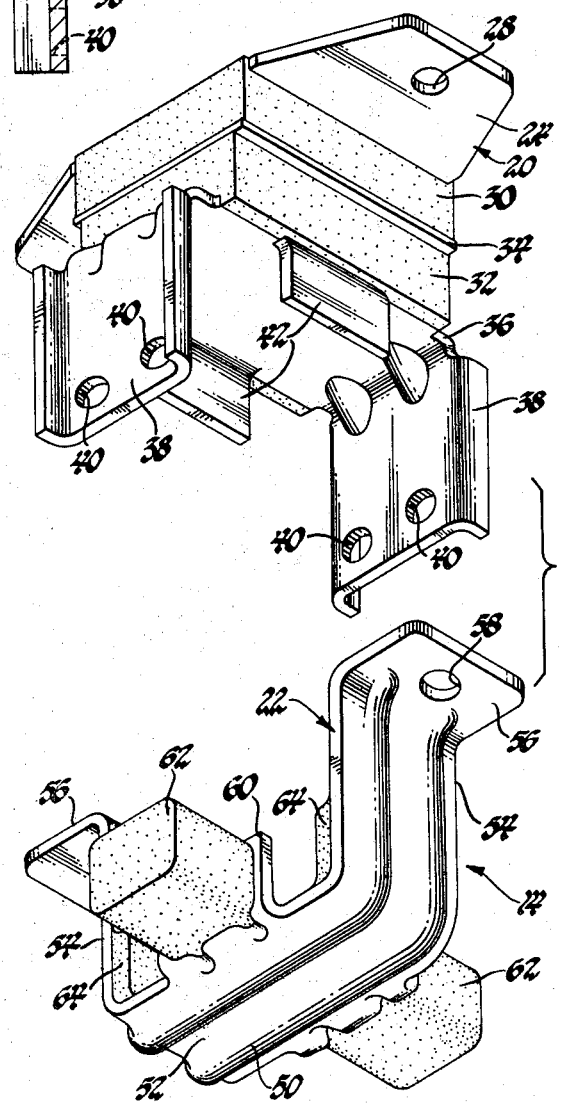

ENGINE MOUNT ASSEMBLY

This invention relates to an engine mount assembly and, more particularly, to a front engine mount assembly for use on a motor vehicle.

More specifically, the invention relates to an improved engine mount assembly for resiliently supporting an engine on the frame of a motor vehicle to provide for vertical, fore-and-aft and roll control of the engine relative to the frame of the motor vehicle.

An engine of the internal combustion type operating in a motor vehicle sets up numerous vibrations, such as fore-and-aft vibrations, torque and torque reaction vibrations and vertical and horizontal vibrations due in part to bounds and rebounds of the motor vehicle as it is moving. In order to eliminate the transmission of these engine vibrations to the vehicle body where they would materially affect the comfort of the passenger therein, it has been customary to use resilient motor mounting to support the engine on the frame of the motor vehicle for the purpose of dampening out these motor vibrations. Such supports, however, are not always successful in accomplishing the results desired due to the loading specifications for a particular engine and vehicle combination, or if successful, are expensive to make. In some cases, both front engine mounts and one or more engine mounts are used to control these vibrations.

It is, therefore, the principal object of this invention to improve a front engine mount assembly for use to resiliently support an engine of the internal combustion type on a vehicle frame in which different rubber compounds can be used to dampen out the various forms of vibrations from the engine.

Another object of this invention is to provide an improved front engine mount assembly which may be economically manufactured and yet which will be highly effective in absorbing engine vibrations and road shocks.

A further object of this invention is to improve engine mount assemblies which will still be operative to connect the engine to the frame of the vehicle in the event of the total failure of the resilient support members of the assembly.

These and other objects of the invention are obtained by means of an engine mount assembly consisting of a first support member having a primary mounting plate and a vehicle mounting plate with a resilient compression support sandwich molded in place therebetween, the latter comprising two U-shaped rubber elements having a steel insert between them, and a second support member including a secondary engine mounting bracket having a pair of rubber roll stops and a pair of compression pads molded thereon, the first member and second member being interlocked together with the compression pads compressed between the two support members in the assembled position.

For a better understanding of the invention, as well as other objects and further features thereof, reference is had to the following detailed description of the invention to be read in connection with the accompanying drawings, wherein:

FIG. 4 is a view taken along line 4—4 of FIG. 3;

FIG. 5 is a view taken along line 5—5 of FIG. 3;

FIG. 6 is an exploded perspective view of the two support members of the engine mount assembly prior to assembly; and FIG. 7 is a perspective view of an assembled engine mount assembly.

Figure 1:
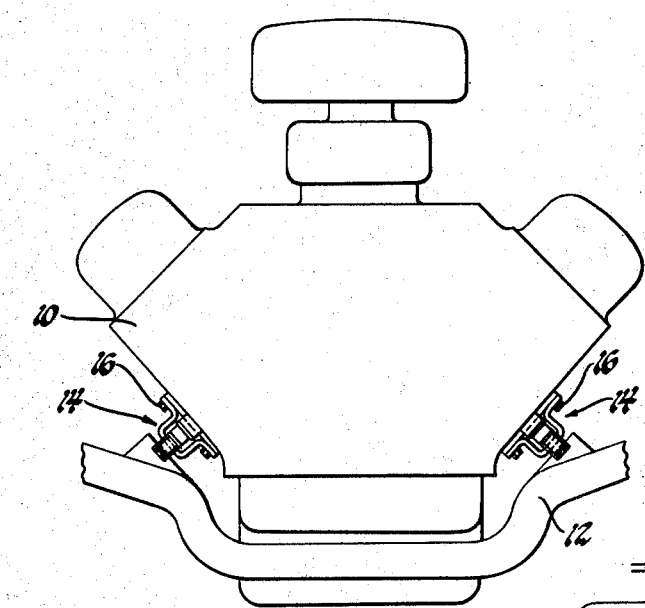
FIG. 1 is a front elevation of a vehicle engine and its supporting frame with a pair of the improved engine mount assemblies of the invention operatively interposed between the vehicle engine and the frame.
Figure 3:
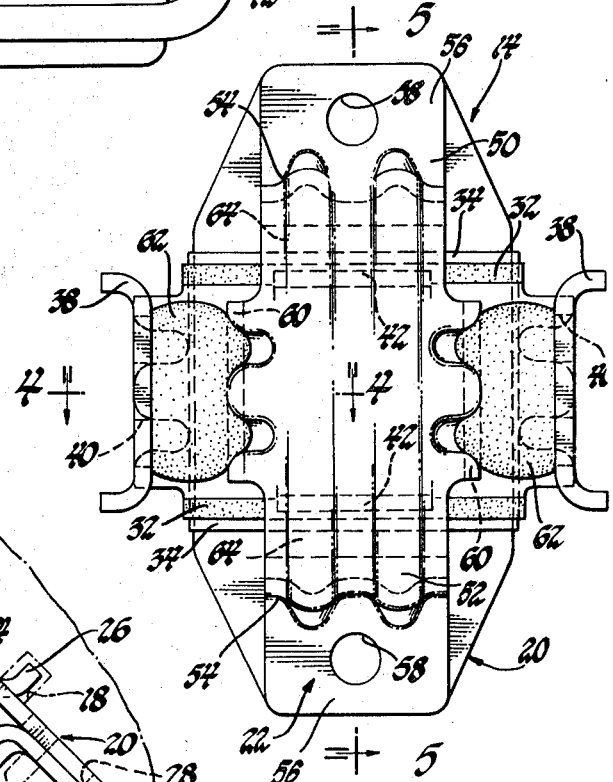
FIG. 3 is a bottom view of an engine mount assembly per se of FIG. 2.

Referring now to FIG. 1, there is shown a conventional vehicle engine 10, a cross member 12 of the vehicle frame for supporting the engine and a pair of resilient engine mount assemblies, generally designated 14, constructed according to the invention, operatively interposed between engine 10 and cross member 12. The engine mount assemblies 14 are secured as by bolts 16 to the engine 10 and cross member 12. Referring now to FIGS. 2 through 7, inclusive, each of the engine mount assemblies according to the invention consists of an upper support member 20 and a lower support member 22 forming a first support member and a second support member, respectively.

The upper support member 20 includes a primary engine mounting bracket 24 and a spaced apart support mounting bracket 36 aligned crosswise to the bracket 24 with a compression sandwich molded therebetween consisting of two U-shaped rubber compression elements 30 and 32 with a steel insert 34 bonded therebetween. Primary engine mounting bracket 24 is in the form of a flat plate having lanced upturned tabs 26, which serve as guides to align the engine 10 thereon, and having holes 28 at the opposite ends thereof to receive the mounting bolts 16. As shown in FIG. 4, the U-shaped side of compression element 30 is bonded to the bottom surface of primary engine mounting bracket 24 while the U-shaped side of compression element 32 is bonded to the top surface of support mounting bracket 36. Support mounting bracket 36 is provided at its ends with depending U-shaped channel mounting flanges 38 provided with holes 40 for receiving mounting bolts 16 for attachment to the cross member 12. The support mounting bracket 36 is also provided intermediate the mounting flanges 38 with depending flange stops 42.

The lower support member 22 includes a secondary engine mounting bracket 50 substantially U-shaped in section and including a central portion 52 provided at opposite ends with upright legs 54, each of which terminates in a lateral flange 56 provided with a hole 58 to receive a mounting bolt 16, and, on opposite sides, the central portion is provided with integral upstanding stops 60. The holes 58 in the secondary engine mounting bracket 50 are positioned to be in alignment with the holes 28 in the primary engine mounting bracket 24 when these two units are assembled. Molded to the outer face of the upright stops 60 are compression pads 62 and molded to the inner surface of the upright legs 54 are roll stops 64. As shown in FIG. 6, the compression pads 62 are molded to the upright stops 60 in any free size or shape as required to meet fore-and-aft loading requirements.

Figure 2:
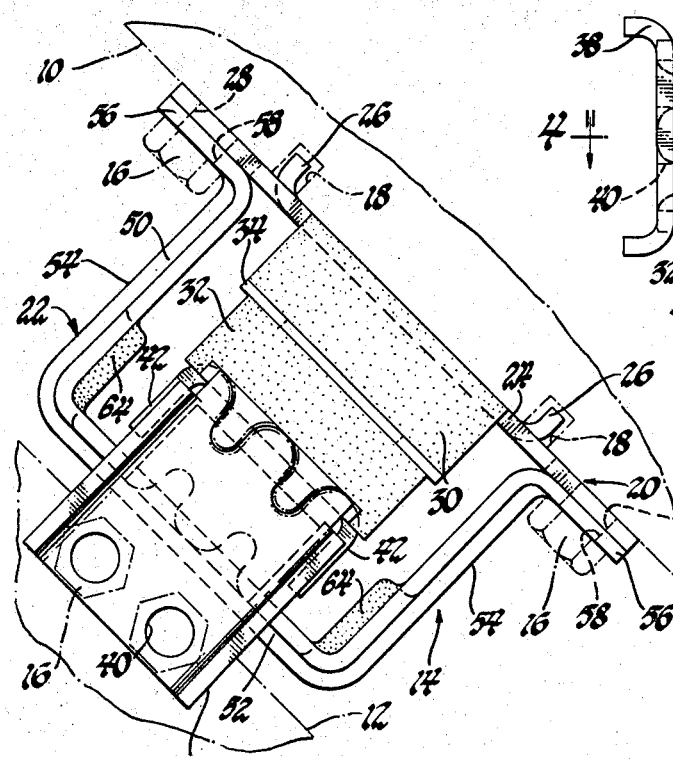
FIG. 2 is an enlarged view of one of the engine mount assemblies of FIG. 1.

When the upper and lower support members are assembled together, the lower support member 22 is forced into interlocking engagement with the upper support member 20 with the compression pads 62 forced into and between the open sides formed by the depending mounting flanges 38 thereby placing the compression pads into a distorted and compressed position as shown in FIGS. 4 and 7, with the lateral flange of the secondary engine mounting bracket 50 abutting the primary engine mounting bracket 24, their respective holes 58 and 28 in alignment to receive the mounting bolts 16 whereby this assembly can be mounted to the engine 10. When mounting this assembly to the engine 10, the upturned tabs 26 of primary engine mounting bracket 24 are inserted into alignment apertures 18 in the engine 10, as seen in FIG. 2. In this assembly of the upper and lower support members 20 and 22, the roll stops 64 are spaced from stops 42 of support mounting bracket 36 and in this position are adapted to engage them to prevent excessive rolling motion of the engine.

With this structural arrangement, the compression pads 62 and roll stops 64 may be molded of a different resilient material, such as a different rubber compound than that used for the compression elements 30 and 32, so as to obtain the desired characteristics of the rubber for control of engine movement in the various directions of motion and to dampen out various forms of vibration. The use of compression pads 62 sandwiched between the upright stops 60 and the depending mounting flanges 38 will prevent excessive fore-and-aft movement of the engine even if there is a failure in the bond of the compression elements 30 and 32 to either the primary engine mounting bracket or to the support mounting bracket 36.

By molding the compression pads to the upright stops 60 of the secondary engine mounting bracket 50 and then forcing the compression pads 62 between the mounting flanges 38 of the support mounting bracket 36 a different effect is created than that which would be created by molding these pads between the same two steel members. If they were molded together, during the cooling process, shrinking would occur thereby putting these compression pads in tension rather than in compression as they are in the subject structure, while at the same time, setting up stresses which could result in early life failure of these pads. By molding the compression pads 62 to the secondary engine mounting bracket 50 and then assembling this unit to the support mounting bracket 38 as previously described, it will place these compression pads in a compressed and preloaded condition. This improves the fatigue life of the compression pad and allows the preloading to be varied as desired, thereby changing the relationship between the fore-and-aft and roll rate of the compression pads as required for a particular engine mounting.

I claim:

1. In an engine mount assembly for resiliently interconnecting an engine and a frame, a U-shaped engine mounting bracket having a base section, end legs terminating in outwardly extending flanges and upstanding side flanges, an inverted U-shaped support member having a base portion, depending legs and depending side flange stops positioned in interlocking relation to said engine mounting bracket, compression pads secured between said upstanding side flanges and said depending legs, roll stop means secured to said end legs adjacent to said depending side flange stops, a primary engine mounting means positioned on said outwardly extending flanges of said engine mounting bracket in spaced relation to said base portion of said support member, and compression means sandwiched between said primary engine mounting means and said base portion and bonded thereto.

2. In an engine mount assembly according to claim 1 wherein said compression means, said compression pads and said roll stop means are of rubber.

3. In an engine mount assembly according to claim 2 wherein the rubber of said compression means is of a different composition than the rubber composition of the said compression pads and said roll stop means.

4. An engine mount assembly for supporting an engine on a support frame comprising a first support member including a primary engine mounting bracket, a compression sandwich and a support mounting bracket, said compression sandwich being secured to and positioned between said primary engine mounting bracket and said support mounting bracket, and a second support member including a U-shaped secondary engine mounting bracket, flexible roll stops secured to opposite ends of said secondary engine mounting bracket, and spaced apart compression pads secured to opposite sides of said secondary engine mounting bracket, said first support member and said second support member being positioned in interlocking relation to each other with said compression pads compressively sandwiched between said secondary engine mounting bracket and said support mounting bracket.

5. An engine mount assembly according to claim 4 wherein said compression sandwich includes compression elements of rubber and wherein said roll stops and said compression pads are of rubber having a different composition than the rubber of said compression elements.

6. In an engine mount assembly for resiliently interconnecting an engine and a frame, a first support member including a primary engine mounting bracket adapted to be secured to an engine, a compression means, and an inverted U-shaped support member having a base section, depending legs adapted to be secured to a frame, and depending side flange stops, said compression means being bonded on one side to said primary engine mounting bracket and the other side to said base section, and a second support member including a U-shaped secondary engine mounting bracket having a base section, end legs terminating in outwardly extending flanges defining planes of attachment to said primary engine mounting bracket and upstanding side flanges, a compression pad secured to each of said side flanges on the outer face thereof and a roll stop secured to each of said legs of said secondary engine mounting bracket on their opposing surfaces, said first support member and said second support member being positioned with said U-shaped support member and said U-shaped secondary engine mounting bracket in interlocking relation to each other with said compression pads compressed against said depending legs and with said depending side flange stops positioned between said roll stops and out of contact therewith.

7. In an engine mount assembly according to claim 6 wherein said compression means includes two rubber compression elements with a steel insert bonded therebetween and wherein said compression pads and said roll stops are of rubber having a different composition than that of said two rubber compression elements.